Patented Jan. 25, 1938

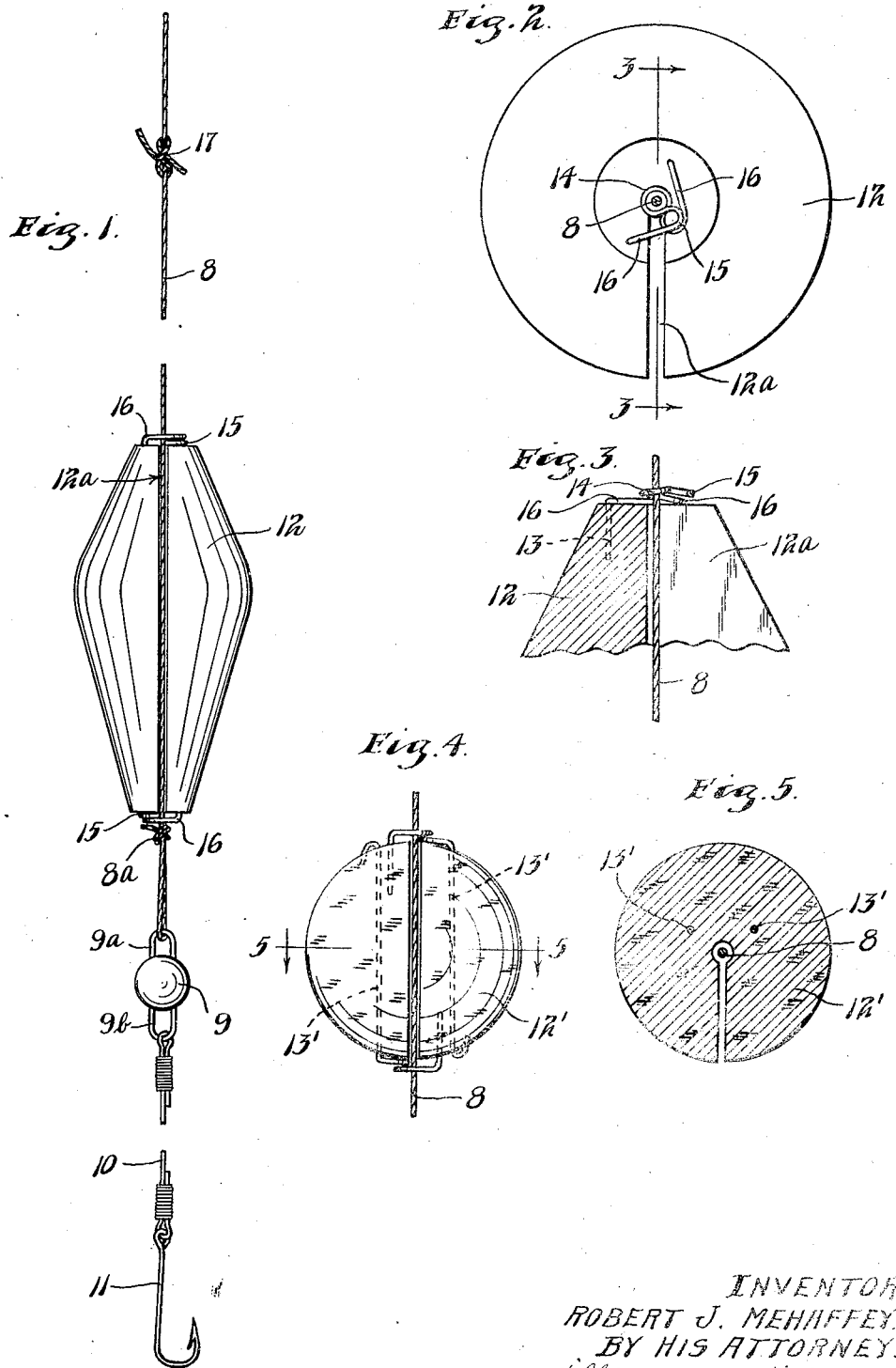

2,106,618

UNITED STATES PATENT OFFICE 2,106,618

CASTING BOBBER

Robert J. Mehaffey, Minneapolis, Minn.

Application August 14, 1936, Serial No. 95,988

3 Claims. (Cl. 43—49)

This invention relates to bobbers or floats for fishing and particularly to a casting bobber which may be successfully used with a casting rod and line.

To utilize a bobber with a casting line and to fish at any considerable depth it is necessary that the bobber slide downwardly upon the line as the line is being wound upon the reel and that furthermore some means be provided for preventing the line from sliding through the bobber beyond a predetermined point when the bait is cast in order that the bait and sinker will be suspended and will not fall to the bottom of the waters fished. Most casting bobbers heretofore used have been objectionable in that the line would often fail to slide freely through the bobber after a cast had been made and in reeling in and further in that heretofore in most instances considerable effort was required in connecting such bobbers with the line. Casting bobbers heretofore extensively utilized furthermore have often become disconnected from the line during the cast or while fishermen were reeling in the line.

It is an object of my invention to provide a very simple, economical and highly efficient casting bobber which will overcome the objectionable features of bobbers heretofore utilized and which will enable a bait caster to fish at various predetermined depths.

It is a further object to provide a strong, durable casting bobber which may be quickly connected with a fishing line without threading the line through the bobber or the guides and which will slide relatively to the line smoothly and with great freedom.

More specifically it is an object to provide a casting bobber having a longitudinal line receiving slit which provides ample freedom for the line to slide relatively to the bobber with a minimum of friction and with which a pair of efficient guide eyes are associated, one at each end of the bobber body, each secured by a pair of spaced prongs and having an entrance element so constructed and positioned that the line may not be accidentally withdrawn or disconnected from the eye during casting or line retrieving operations.

These and other objects and advantages of the invention will be more fully set forth in the following description made in connection with the accompanying drawing, in which like reference characters refer to similar parts throughout the several views, and in which:—

Fig. 1 is a view in side elevation showing an embodiment of my casting bobber operatively connected with a casting line;

Fig. 2 is a top plan view of the same;

Fig. 3 is a fragmentary vertical section taken on the line 3—3 of Fig. 2;

Fig. 4 is a side elevation showing a somewhat different form of the invention applied to a cork body or float, and Fig. 5 is a cross section taken on the line 5—5 of Fig. 4.

In the form of the invention shown in Figs. 1 to 3, a casting line 8 is illustrated having attached at the lower end thereof a sinker 9 which may be of any suitable form. With the type of sinker shown the weight is provided with a pair of loops 9a and 9b respectively, the upper of which is secured to the line and the lower of which is secured to the leader 10 with which the hook 11 is connected.

My improved bobber body 12 may be constructed from any suitable light, buoyant material, such as light wood or cork and is preferably of symmetrical shape having a longitudinal line receiving slit 12a extending the full length of the body and from the periphery inwardly to at least the longitudinal center line or axis of the body. I prefer to ream out or drill the end of the slit portion 12a of the body 12 axially of the body to provide a smooth cylindrical surface defining an aperture or bore of considerably greater diameter than the thickness of any line utilized. At each end of the bobber body 12 I provide an efficient guide eye member having a line attaching entrance associated therewith. The guide eye member is preferably constructed from a small piece of wire having adequate resiliency and includes a pair of spaced attachment prongs 13 which are formed by the ends of a short piece of wire bent perpendicularly to the general plane defined by the medial portion of the wire which is bent to form the eye and attachment entrance. The prongs 13 are rigidly set into the end of the bobber body 12. The medial portion of the guide eye member is bent into the form of a figure 8, as clearly shown in Fig. 2, the outer loop 14 of the figure 8 constituting an annular guide eye axially aligned with the bore of the body and the inner loop of the figure 8 being defined by lapped, arcuately curved portions oppositely disposed and normally being resiliently held in contact with one another to form the line entrance 15 therebetween. The said line entrance is preferably disposed in juxtaposition to one end of the body 12 and at one side of the line receiving slit 12a rather than in alignment with any portion of the slit. Attachment prongs 13 are spaced rather widely apart and are connected at their upper portions with the line entrance and eye. The arms 16 which extend as shown in approximately a common plane define an angle and thereby enabling the prongs 13 to be substantially in alignment with the center of the eye 14. The guide eye members at each end of the bobber are identical and in the drawing similar elements thereof are therefore numbered alike.

An adjustable stop or abutment for limiting upward movement of the bobber relatively to the line is provided as shown in the form of a suitable knot 17 formed by a short piece of line or string surrounding the casting line 8 and frictionally secured thereto, although slidable for adjustment purposes. Any suitable knot may be utilized, although I prefer a "clove hitch" formed by a short piece of string with the free ends of the piece clipped close to the knot. The knot should be utilized which is naturally of sufficient thickness to prevent its being drawn through the eye 14 but which nevertheless will readily slip through the guides of conventional line guiding attachments now extensively utilized on fishing reels to assure a uniform winding.

In operatively connecting my casting bobber with the line the line is first forced into the guide eye 14 through the entrance 15 by simply pulling it between the two resilient arcuate portions which define the inner loop of the figure 8 and is then disposed in the slit 12a and fed into the eye 14 of the lower guide eye member in a similar manner to the connection of the line with the upper guide member. The bobber is then axially mounted upon the line guided principally by the two eyes 14 and does not frictionally engage the bore of the body to any appreciable extent.

In Fig. 1 a bobber is shown in the position it assumes when the line is being reeled in having slid to its extreme position adjacent the lower end of the line where the lower guide element 14 abuts the knot 8a disposed a short distance above the sinker. When the line is cast the weight of the bobber as well as, of course, the sinker and the weight of the bait facilitates the casting of the line and immediately upon the striking of the water the weight 9 causes the line 8 to slide downwardly through the buoyant bobber body, the line being guided and running smoothly through the two guide eyes 14 until the abutment knot 17 engages the upper guide eye 14. Knot 17 may, of course, be set on the line for fishing at various depths within, of course, the limits of the line.

The guide eye member being rigidly attached by two spaced prongs will not bend out of shape in hard continuous use or permit the eye 14 to be angled or tilted with reference to either of the arms 16 or the attachment prongs. The guide eyes are thus kept in perfect alignment with the axial bore of the body and the entrance 15 is maintained against the end of the bobber to which the guide member is secured. The line cannot become detached from one of the guide eyes unless it is bent transversely above or below the bobber and again forced outwardly through the resilient entrance 15. The positioning of the entrance 15 at one side of the line receiving slit prevents accidental disconnection of the line and further facilitates connection of the line with the guiding members.

The form of the invention illustrated in Figs. 4 and 5 is for the most part identical with that shown in Figs. 1 to 3. However, in this case a buoyant body of compressible material, such as cork, is utilized and one of the prongs 13' of each of the guide eye members extends through the entire body 12' and has its free end turned and clinched against the body to positively prevent withdrawal of the guide member. This form of the invention is particularly adaptable for cork bobbers.

From the foregoing description it will be seen that I have provided a very simple, comparatively inexpensive casting bobber which may be readily attached to and disconnected from casting lines, which will successfully operate after hard continued usage and which will give a maximum freedom for sliding of the line relatively to the bobber body during dropping of the line after casting as well as when the line is reeled up.

It further will be seen that with my construction the line cannot become accidentally disconnected from the guide eyes and the guide eyes and the line entrance cannot become displaced or tilted from their correct positions relative to the axis of the bobber body.

With my structure, if it is desired to utilize the bobber for still fishing with long poles, the line may be wrapped about one of the guide members a second time still permitting of sliding adjustment on the line while, however, offering sufficient resilience to retain the bobber in a desired position. The same results for still fishing may be obtained by bringing the line back from the lower guide to the upper guide and through the guide eye and then back to the lower guide and through that guide eye the second time.

It will, of course, be understood that various changes may be made in the form, details, proportions and arrangement of the parts without departing from the scope of my invention.

What is claimed is:—

1. A fishing bobber comprising a body constructed of buoyant material having a longitudinal line receiving slit extending from its periphery inwardly for some distance, and a pair of guide eyes, one at each end of said body and each comprising a piece of wire having a pair of widely spaced prongs extending longitudinally and anchored in said body, the portion of said wire between said prongs being bent into a figure 8 shape with one loop of said figure 8 disposed in alignment with the inner end wall of said slit portion and with the other loop of said figure 8 defined by over-lapping curved portions which form an entrance for the insertion of a line into said first mentioned loop portion.

2. The structure set forth in claim 1 and said over-lapping entrance portions being disposed out of alignment with any portion of said slit.

3. A fishing bobber comprising a body constructed of buoyant material having a longitudinal line receiving slit extending from its periphery inwardly for some distance, and a pair of guide eyes, one at each end of said body and each comprising a piece of wire having a pair of widely spaced prongs extending longitudinally and anchored in said body, one of said prongs extending through said body and having its end clinched against the opposite end of said body, the portion of said wire between said prongs being bent into a substantially circular loop disposed in alignment with the inner portion of said slit, said loop having entrance portions for the insertion of a line under said loop.

ROBERT J. MEHAFFEY.